July 10, 1962  J. H. GERSTENMAIER ETAL  3,042,974
METHOD OF MAKING MATS
Filed Jan. 15, 1960

INVENTORS
JOHN H. GERSTENMAIER
THOMAS J. LEO
RAY H. MILLER
THEODORE E. SHAUL
J. B. Holden
ATTORNEY United States Patent Office 3,042,974
Patented July 10, 1962

3,042,974
METHOD OF MAKING MATS
John H. Gerstenmaier, Cuyahoga Falls, and Thomas J. Leo, Ray H. Miller, and Theodore E. Shaul, Akron, Ohio, assignors to The Goodyear Tire & Rubber Company, Akron, Ohio, a corporation of Ohio
Filed Jan. 15, 1960, Ser. No. 2,745
9 Claims. (Cl. 18—53)

This invention relates to the manufacture of floor coverings and more particularly to a method of making mats with a predetermined surface configuration and also contoured in many instances. The invention is particularly suitable for the manufacture of automobile floor mats.

The present-day methods of making automobile floor mats involve the use of a rubber or other vulcanizable stock and elaborate equipment which requires large capital investment. This equipment includes not only the molds themselves but also the presses or autoclaves with which the molds are used and as a result, the unit cost of a mat must include a substantial amount to cover this capital investment. Each of the present methods involving such equipment include the use of substantial pressure to retain the mat stock against the mold surface during vulcanization as well as obtain satisfactory physical properties of the stock. In most instances the pressure is supplied by high pressure steam which not only subjects the mat stock to a predetermined pressure but also supplies the heat for vulcanizing the stock.

It has been the usual assumption in the manufacture of products from rubber or rubber-like vulcanizable material that the material must be vulcanized under a substantial positive pressure if the desirable physical properties were to be obtained. It has been found that satisfactory automobile or other floor mats can be obtained by the application of approximate atmospheric pressure only by vulcanizing the mat stock with heat entering the stock from only one surface. This causes a gradual heating up of the stock by heat transferring into the stock from the heated surface to complete the vulcanization of the mat. It is therefore an object of this invention to provide a new and novel method of vulcanizing floor mats.

A further object of the invention is to provide a method of vulcanizing floor mats that requires a considerably smaller investment in equipment than heretofore-used methods.

A still further object of the invention is to provide a method of vulcanizing floor mats under less pressure than that required by the usual techniques.

Another object of the invention is to provide a method of vulcanizing floor mats in which the vulcanization is accomplished by the application of heat to the one surface only of the mat.

These and other objects of the invention will appear hereinafter as the description thereof proceeds, the novel arrangements, features and combination being clearly set forth in the description and in the appended claims.

Figure 1:
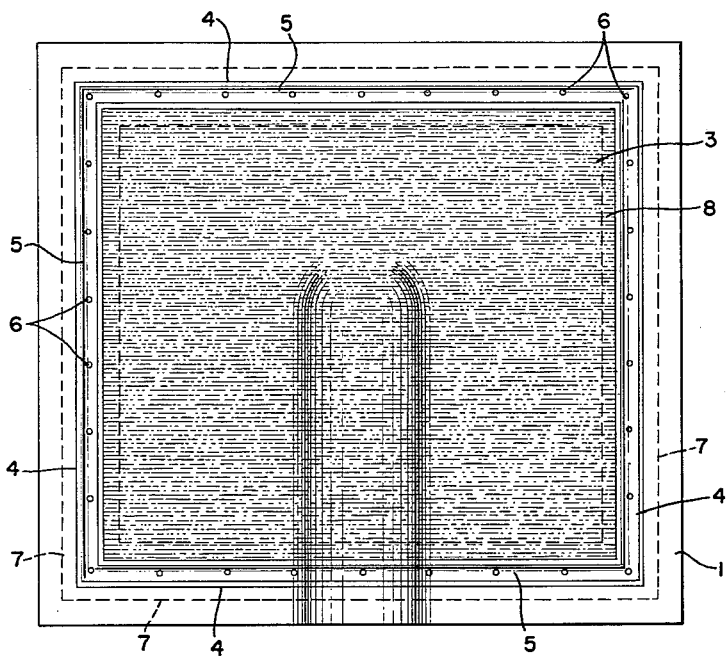
FIG. 1 is a plan view of a representative mat mold.
Figure 2:
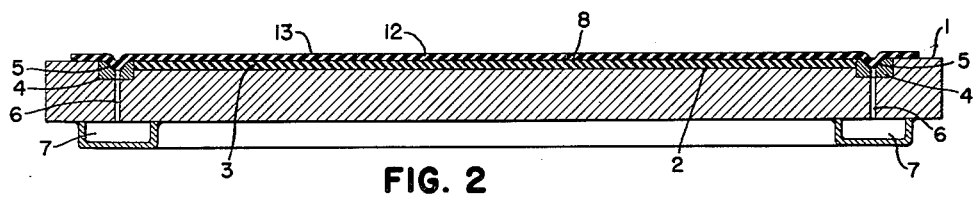
FIG. 2 is a diagrammatic section of the mold shown in FIG. 1.

In FIGS. 1 and 2, a typical mat mold structure is illustrated in which a mold base 1 usually a casting, includes a cavity 2 in which the mat is formed and vulcanized. As illustrated, to form the desired mat surface configuration in the cavity 2, a cavity insert 3 of hard rubber, aluminum, epoxy resin or other suitable material is fixed to the cavity surface of the mold 1. As shown, the mold base 1 is recessed to receive the insert 3 so that the surface is substantially flush with the marginal portions of the base 1. The insert 3 defines substantially the area of the mold base in which the finished mat is produced.

As illustrated, adjacent the periphery of the insert 3, a strip insert 4 of aluminum or other good heat-conducting material is firmly attached to the mold casting and extends around the entire periphery of the cavity insert 3. A sealing groove 5 is positioned in the upper surface of the insert 4 adjacent the periphery of the cavity insert 3. At spaced intervals about the periphery of the mold a series of openings or air bleeds 6 on the bottom of mold base extending from the bottom of the groove 5 communicate with a vacuum chamber 7 underlying the groove 4. A source of vacuum, not shown, is connected to the chamber 7 so that the vacuum is in communication with the groove 5 when desired during the operation of the apparatus.

Figure 3:
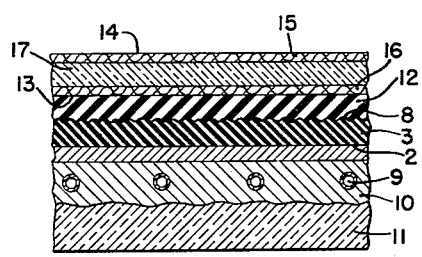
FIG. 3 is an enlarged section of a portion of a mold structure suitable in practicing the invention.

The surface 8 of cavity insert 3 may be heated in any desired manner such as by electrical heating elements, coring mold base 1 for steam passage, creating a steam chamber below the insert or any other manner. In FIG. 3 a schematic detailed section of a mold, illustrates one very satisfactory structure for heating the cavity surface to vulcanize the mat stock. Tubing 9, for example copper, is positioned on the undersurface of the mold base 1 to underlie the cavity insert 3 surface. The tubing 9 may be a series of individual spaced tubes connected to a source of steam through a common header or lengths of tubing serpentined back and forth so as to provide a substantially uniform coverage of the cavity insert 3. In any event, it is desirable that the tubing 9 be in contact with or as close as possible to the undersurface of base 1. Clips (not shown) may be attached to the base 1 at spaced intervals to hold the tubing 9 in position. As shown, the tubes are then covered and fully embedded in a good heat-conducting material 10 which intimately contacts the tubing 9 and the underside of the mold cavity 2 to provide a very efficient layer of heat-conducting material. There are commercially available materials particularly suited for this purpose and one such material is a dry granular material which is mixed with water to a workable consistency. Upon drying, the material becomes very hard and is a very efficient heat conductor. A layer of heat insulating material 11 preferably covers the exposed surface of the layer 10 in which the tubing 9 is embedded to prevent heat loss and cause the heat from the tubing 9 to be directed toward the mold surface 8 for more efficient operation.

In the operation of the mold to vulcanize a floor mat, an unvulcanized sheet 12 of mat stock of rubber or rubber-like material of a size larger than that of the finished mat is positioned over the mold base 1 and is manipulated by the operators so as to contact the insert surface 8 over substantially the entire area. The sheet 12 of stock is then urged into contact with the groove 5 around the entire periphery so that the vacuum draws the sheet 12 into intimate contact with the surface of the mold insert 3. The vacuum withdraws the air between the sheet 12 of mat stock and mold surface 8 to attain this intimate contact. After the intimate contact between the mat sock and mold surface is attained, preferably the exposed surface 13 is covered to prevent any substantial heat loss therefrom. By so doing, the heat is substantially confined in the stock to accomplish vulcanization as efficiently as possible. A particularly effective manner of covering the exposed surface 13 is the use of a blanket 14 formed of layers 15 and 16 of heavy heat-resisting fabric (such as asbestos) encasing a fibre glass mat 17. The blanket 14 is attached to a pipe frame (details not shown) which is pivotally mounted so that it can be moved onto and away from the exposed surface 13 of the mat stock.

Figures 4, 5:
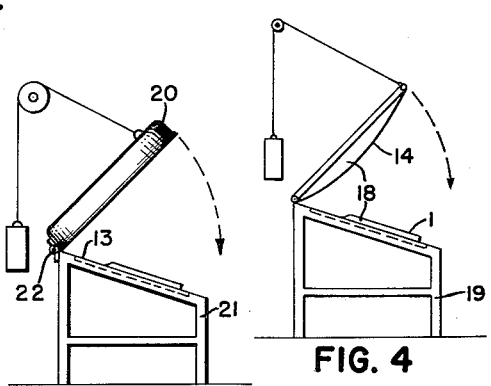
FIG. 4 is a schematic view of one form of the apparatus used in practicing the invention.
FIG. 5 is a schematic view of another form of the apparatus used in practicing the invention.

In another form of cover as seen in FIG. 5, a hood 20 positioned over the mat stock during vulcanization will form an air chamber over the exposed surface 13 of the mold assembly supported on a framework 21 in an inclined position. Hood 20 is pivoted at 22 and counterweighted for ease of moving in and out of position by the operator. The air confined in the chamber will provide an effective insulation to prevent substantial heat loss and if desired, the air may be heated when the hood is in position to cause a more effective insulator.

It has been found that by circulating steam at a temperature of approximately 315° F. in the tubing 9, satisfactory vulcanization of the mat is accomplished. When the cavity insert 3 is exposed during the operation of the apparatus, the temperature of the insert surface drops to a temperature in the range of 200 to 225° F. This temperature is sufficiently low so that little if any vulcanization of the rubber material will be effected. After the sheet 12 of mat stock is positioned on the cavity insert 3 and intimate contact made therebetween by the vacuum withdrawing the air, the temperature gradually rises to substantially 295° F. during the period the sheet of mat stock is over the mold surface so that substantial vulcanization will take place. As the sheet 12 of mat stock remains in contact with the cavity insert 3 surface 8, the heat is transferred into the mat stock through surface contact so as to pass therethrough and complete the vulcanization of the mat stock. The insulating blanket 14 on the exposed surface of the mat stock prevents substantial radiation of the heat from the exposed surface and thereby retains the heat in the mat to reduce the time necessary to vulcanize the mat. When vulcanization is complete, the mat is removed from the mold thereby uncovering the surface of mold insert 3 so that the temperature of the mold insert surface will drop again to the range of 200 to 225° F. before another sheet 12 of mat stock is positioned on the mold. The vulcanization is then completed in the newly applied sheet of mat stock in the same manner as previously described.

In FIG. 4 a typical apparatus 18 including the previously described mold structure is illustrated in which the mold base is supported on a stand 19 preferably in an inclined position for ease of access by the operators. The insulating blanket 14 for the top surface is pivoted and counterweighted over the mold base so that it is only necessary for the operator to pull the lid down against the exposed surface of the mat stock after it is positioned on the mold insert 3.

While certain representative embodiments and details have been shown for the purpose of illustrating the invention, it will be apparent to those skilled in the art that various changes and modifications may be made therein without departing from the spirit or scope of the invention.

Having thus fully described our invention, what we claim and desire to secure by Letters Patent of the United States is:

1. The method of vulcanizing a floor mat having a surface configuration comprising placing one surface of a sheet of substantially air impervious vulcanizable mat stock on a heated mold surface of a predetermined configuration, the temperature of said surface being in a range wherein no substantial vulcanization of the mat stock will occur, applying a vacuum between the sheet of stock and mold surface to cause intimate contact between the surface of the mold and mat stock in the absence of positive pressure applying means on the other surface of the sheet of mat stock, maintaining said vacuum to retain the intimate contact to allow the temperature of the mold surface to gradually raise to one at which substantial vulcanization of the mat takes place by heat transfer from the mold surface into the sheet of stock and simultaneously preventing heat radiation from the exposed surface of said mat stock to substantially retain said heat in said mat stock until vulcanization is complete.

2. A method as claimed in claim 1 in which the initial temperature of the mold surface is less than 225° F. and the final temperature is at least 275° F.

3. The method of vulcanizing a floor mat having a surface configuration comprising placing one surface of a sheet of substantially air impervious vulcanizable mat stock on a heated mold surface of a predetermined configuration, the temperature of said surface being in a range wherein no substantial vulcanization of the mat stock will occur, applying a vacuum between the sheet of stock and mold surface to cause intimate contact between the surface of the mold and mat stock in the absence of positive pressure applying means on the other surface of the sheet of mat stock, maintaining said vacuum to retain the intimate contact to allow the temperature of the mold surface to gradually raise to one at which substantial vulcanization of the mat takes place by heat transfer from the mold surface into the sheet of stock and simultaneously covering the exposed surface of said mat stock to prevent substantial heat loss from said mat stock during vulcanization thereof.

4. The method of vulcanizing a floor mat having a surface configuration comprising placing one surface of a sheet of substantially air impervious vulcanizable mat stock on a heated mold surface of a predetermined configuration, the temperature of said surface being in a range wherein no substantial vulcanization of the mat stock will occur, applying a vacuum between the sheet of stock and mold surface to cause intimate contact between the surface of the mold and mat stock in the absence of positive pressure applying means on the other surface of the sheet of mat stock, maintaining said vacuum to retain the intimate contact to allow the temperature of the mold surface to gradually raise to one at which substantial vulcanization of the mat takes place by heat transfer from the mold surface into the sheet of stock and simultaneously placing a hood over the exposed surface of the mat to create an air chamber to prevent substantial heat loss from said mat stock during vulcanization thereof.

5. A method as claimed in claim 4 in which the air under said hood is heated during vulcanization.

6. The method of vulcanizing a floor mat having a surface configuration comprising placing one surface of a sheet of substantially air impervious vulcanizable mat stock on a heated mold surface of a predetermined configuration, the temperature of said surface being in a range wherein no substantial vulcanization of the mat stock will occur, applying a vacuum between the sheet of stock and mold surface to cause intimate contact between the surface of the mold and mat stock in the absence of positive pressure applying means on the other surface of the sheet of mat stock, maintaining said vacuum to retain the intimate contact to allow the temperature of the mold surface to gradually raise to one at which substantial vulcanization of the mat takes place by heat transfer from the mold surface into the sheet of stock and positioning a layer of insulating material on the exposed surface of said mat stock to prevent any material radiation of heat therefrom thereby retaining a substantial portion of the heat in the sheet of stock to vulcanize it.

7. A process of vulcanizing floor mats having a predetermined surface configuration comprising the steps of placing one surface of a sheet of substantially air impervious vulcanizable stock on a heated mold surface of said predetermined configuration, the temperature of said surface being in a range wherein no substantial vulcanization will occur, applying a vacuum between the mat stock and mold surface to cause intimate contact between the surface of the mold and mat stock in the absence of positive pressure applying means on the other surface of the sheet of mat stock, maintaining said vacuum to retain said intimate contact to allow the temperature of the mold surface to gradually raise to one at which substantial vulcanization takes place by heat transfer from the mold surface to the sheet of stock, providing an insulating layer on the exposed surface of the sheet of stock to confine the heat within said sheet of stock for a time sufficient to vulcanize said stock, removing said insulating layer and vulcanized sheet of stock from said mold, cooling the mold surface to a temperature at which no substantial vulcanization will occur and then placing another sheet of unvulcanized mat stock on said mold surface, applying a vacuum between said mold surface and mat stock to provide intimate contact therebetween, maintaining said vacuum to allow the temperature of the mold surface to gradually raise to one at which substantial vulcanization takes place by heat transfer from the mold surface into the mat stock, simultaneously insulating the exposed surface of said mat stock to prevent heat radiation therefrom thereby confining said heat in said mat stock to complete the vulcanization of said mat and repeating said steps on other sheets of unvulcanized mat stock.

8. The method of vulcanizing a floor mat having a surface configuration, comprising the placing of a sheet of substantially air impervious vulcanizable stock on a mold having a heat-radiating surface of predetermined configuration, applying a vacuum between the mold surface and sheet of stock to urge the sheet of stock into intimate contact with the mold surface and retain it thereon in the absence of positive pressure applying means on the other surface of the sheet of mat stock, vulcanizing the sheet of stock by heat transferring from the mold surface into the sheet of stock through the surface thereof in contact with the mold surface, and simultaneously preventing radiation from the exposed surface of the mat stock to confine the heat within said mat stock to vulcanize said mat.

9. The method of vulcanizing a floor mat to a predetermined surface configuration, comprising the steps of placing a sheet of substantially air impervious vulcanizable mat stock on a mold having the predetermined surface configuration, applying vacuum between the mold and mat stock to urge the sheet into intimate contact with said mold and thereafter retain it in the absence of positive pressure applying means on the other surface of the sheet of mat stock, heating to a predetermined temperature only the surface of the stock in contact with said mold surface for a length of time sufficient to vulcanize said mat stock as the heat transfers into the stock and simultaneously insulating the opposite side of said mat stock to substantially confine the heat within said mat stock.

References Cited in the file of this patent

UNITED STATES PATENTS

| | | |
|---|---|---|
| 1,535,354 | Steel et al. | Apr. 28, 1925 |
| 1,592,536 | O'Neill | July 23, 1926 |
| 2,231,057 | Dieterich | Feb. 11, 1941 |
| 2,478,165 | Collins | Aug. 2, 1949 |
| 2,517,701 | Oettinger | Aug. 8, 1950 |
| 2,531,218 | Johnson | Nov. 21, 1950 |
| 2,694,227 | Fordyce et al. | Nov. 16, 1954 |
| 2,797,439 | Borkland | July 2, 1957 |

OTHER REFERENCES

Ser. No. 395,688, Grundel (A.P.C.), published April 27, 1943.